April 16, 1968     M. O. ALBERT     3,377,654
ONE-PIECE MOLD CAVITY ELEMENT FOR PRODUCING
EXPANDED POLYSTYRENE DRINKING CUP
Filed May 9, 1966                                                  3 Sheets-Sheet 2
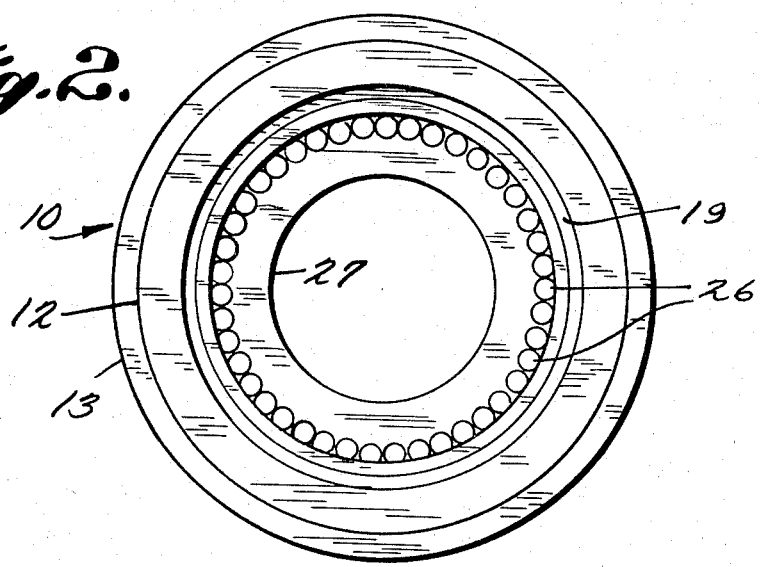
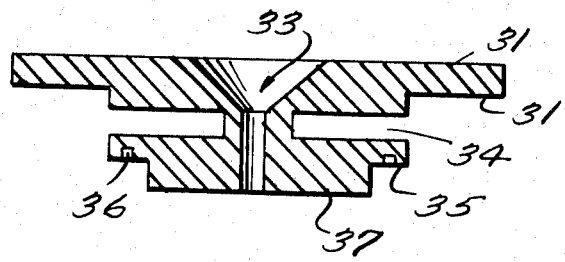
INVENTOR.
MARCEL O. ALBERT
BY
Cushman, Darby & Cushman
ATTORNEYS April 16, 1968 M. O. ALBERT 3,377,654
ONE-PIECE MOLD CAVITY ELEMENT FOR PRODUCING
EXPANDED POLYSTYRENE DRINKING CUP
Filed May 9, 1966 3 Sheets-Sheet 3
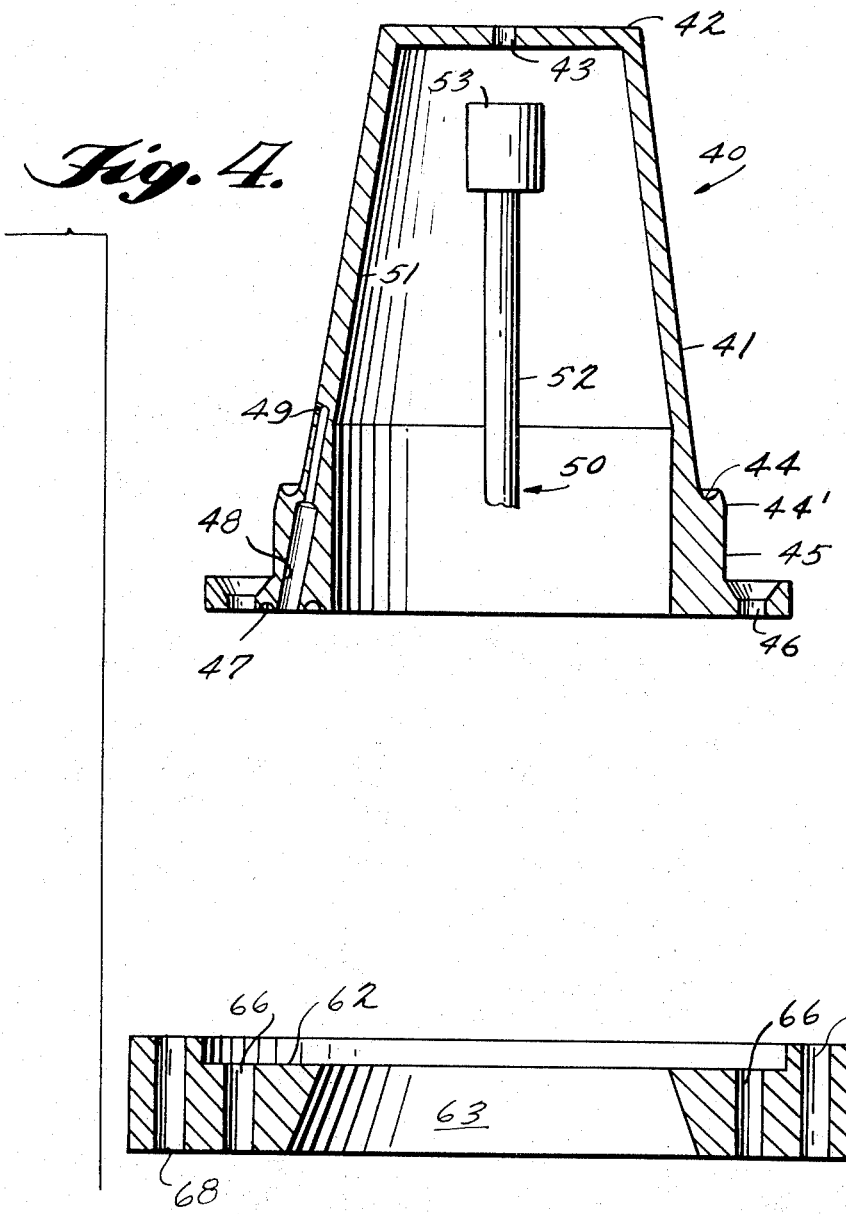
INVENTOR.
MARCEL O. ALBERT
BY
Cushman, Darby & Cushman
ATTORNEYS

# United States Patent Office 3,377,654
Patented Apr. 16, 1968

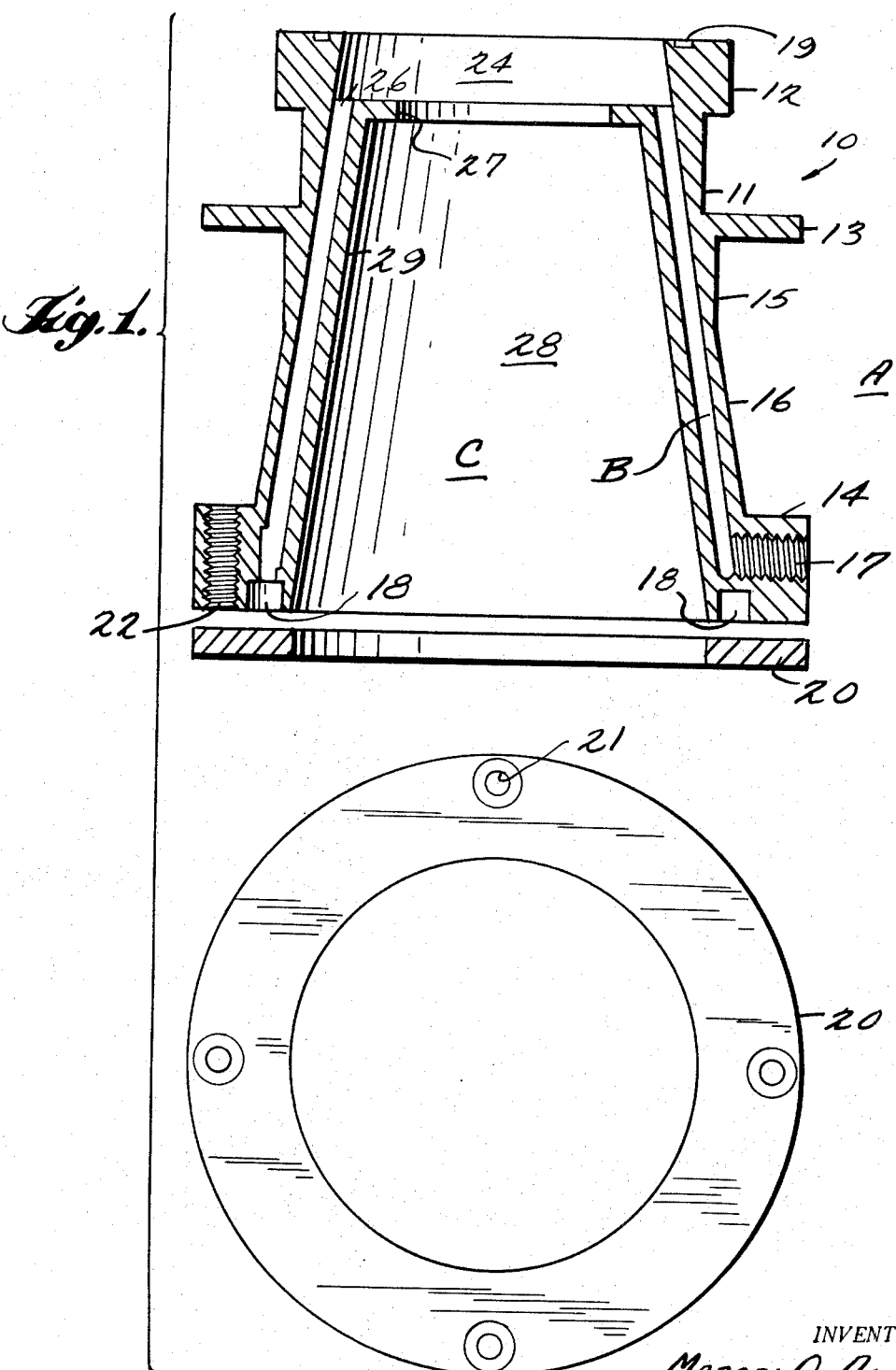

3,377,654
ONE-PIECE MOLD CAVITY ELEMENT FOR PRODUCING EXPANDED POLYSTYRENE DRINKING CUP
Marcel Olivier Albert, St. Leonard, Md.
(% Polycup, 3221 Colvin St., Alexandria, Va. 22314)
Filed May 9, 1966, Ser. No. 548,460
5 Claims. (Cl. 18—5)

This invention relates to an improved mold for producing cups from expanded polystyrene beads or pellets. More particularly, this invention relates to a one-piece mold cavity that is used together with a cup-shaped mold core element and associated parts for the injection molding of pre-expanded polystyrene particles into drinking cups having improved insulating properties.

It is known to foam expansible styrene polymer compositions, e.g., solid granules of polystyrene containing a volatile organic liquid such as pentane, hexane, petroleum ether, and the like, boiling below the softening point of the polymer, as the foaming agent, by heating granules of the polymer in any usual way such as with hot water, steam, or infrared lamps. Molded cellular articles are readily prepared from granules of foamable styrene polymer compositions by placing a quantity of the expansible material in a porous mold which permits the escape of gases, usually in an amount corresponding to twenty percent or less of the volume of the mold cavity, then heating the granules in a closed mold, whereby they expand and press against walls of the mold and against one another with resultant bonding or flowing together to form a cellular article having the shape of the mold cavity. In preparing molded articles from particles of expandible styrene polymer compositions it is common practice to prefoam or partially form up the styrene polymer granules, then to fill or substantially fill a mold cavity with a quantity of the prefoamed granules which are capable of still further foaming up and heat the granules to cause expansion thereof in the closed mold with a resultant flowing together and bonding of the granules with one another to form a cellular article conforming to the shape of the mold cavity. Such procedure, in general, makes molded articles of somewhat better uniformity of foam density throughout a molded article, and of better foam. The prefoaming or partially foaming up of small particles, granules or beads of the foamable styrene polymer compositions presents no difficult problems since small particles or beads of the granular material can readily be fed to a heating zone wherein it is partially foamed up and is easily removed from said zone.

Presently known apparatus and procedure for the production of drinking cups from the foamable polystyrenes however, are objectionable for economical mass production. The typical presently known molding apparatus for producing articles of this type is comprised of a plurality of moving parts, and the mold components themselves, particularly the mold cavity element, are fabricated from a number of separate parts. While this may not be objectionable per se, present molding apparatus in this field are known to suffer from much down time for repairs and correction of faulty operation, such that truly economical, continuous production has not been achieved. Also, present molding apparatus in this field, aside from down time, has a production rate that is unusually slow compared to the production rate that is accomplished by the apparatus according to this invention, and this improved production rate is believed to stem directly from the structure according to this invention.

It is therefore a principal object of this invention to provide an improved mold for the production of drinking cups of expanded polystyrene.

It is another object of this invention to provide a mold of the type indicated, having a one-piece mold cavity element that will permit a higher production rate than known heretofore, and that will not be subject to the disadvantages of presently known apparatus for molding expanded polystyrene articles.

Ancillary to the preceding objects, it is an object of this invention to provide, as a function of the apparatus, an improved expanded polystyrene drinking cup that will be thicker and stronger than presently known cups of this type, but will require only about half as much material as such presently known cups.

Other and further objects of this invention, together with an appreciation for the advantages thereof, will become more apparent as this description proceeds.

Stated simply, the objectives of this invention are achieved, and many advantages realized, by fabricating the improved mold cavity element of this invention from a single casting. This mold cavity element is then combined with an improved cup-shaped mold core and an improved filling and closing element, as well as certain ancillary equipment that is employed to realize the full production capacity of this development.

The understanding of this invention will not be facilitated when reference is had to the accompanying drawing wherein:

FIGURE 1 is a cross sectional side elevation of the one-piece mold cavity element according to the present invention;

FIGURE 2 is a plan view of the mold cavity element shown in FIGURE 1;

FIGURE 3 is a cross sectional side elevation of the mold filling and closing element that is used according to the present invention; and FIGURE 4 is a cross sectional side elevation of the mold core element and fluid conduit that is employed according to the present invention.

Turning to FIGURE 1 of the drawings, the one-piece mold cavity element according to the invention is indicated generally by the reference numeral 10, is comprised of an outer actuating area A, an intermediate temperature effect area B, and an interior molding area C. The mold cavity element 10 preferably has a generally tapered body that may be smoothly tapered, or may have a number of concentric right cylindrical surfaces such as the surface 11. A top flange is provided at 12, an actuating flange is provided at 13 and a bottom flange at 14. The tapering side wall between the flanges 13 and 14 may be smoothly tapering as at 16, although it is desired, for purposes of strength and ease in fabrication, to interrupt the surface 16 with a right cylindrical shape at 15. The lowermost flange 14 is provided with a conduit opening 17 for supplying the fluids according to the present invention, to the intermediate area B of this cavity element, as will be described hereinafter. The bottom flange 14 is also interrupted by a ring shaped recess 18 that is provided for drainage purposes and to communicate with the intermediate area. Bolt receiving openings may be provided at 22 to secure the bottom closure member 20 to the mold cavity element by means of the openings at 21.

The upper flange surface 12 of the mold cavity element may be provided with a ring shaped recess at 19 for receiving an O ring to provide better sealing with the mold closing element 30. As shown in FIGURE 1, the mold cavity element is provided with a counterbore at 24 to receive the mold closing element and to permit better communication with the intermediate area. The intermediate area is defined by a plurality of borings 26. The borings 26 are an important feature according to the present invention, that permit the mold cavity element of this invention to be formed from a single piece casting. Such casting is provided with the general shape of the exterior and interior shown in FIGURE 1 but without the bore holes 26. After casting, the mold cavity element is then bored a plurality of times with the bore holes shown to provide an essentially hollow intermediate area wherein the mold cavity interior is connected to the mold cavity exterior by a number of thin tapering webs that remain after boring the openings 26. As shown in the drawings, the borings 26 are then in communication at their upper end across the counterbore 24 and are in communication at their lower end with the ring shaped drain opening 18.

Beneath the counterbore 24 is a further narrower counterbore 27 which defines an opening into the interior molding area 28 of the mold cavity element. The interior molding area is provided with a smooth tapering surface at 29 which is adapted to contact the material to be molded. As shown, the area 28 with walls 29 and counterbore 27 have the general shape of a drinking cup.

Turning to FIGURE 3, the mold closing element indicated generally at 30, has a disc like body at 31 with an undercut surface at 32 that is adapted to rest upon the flange 12 of the mold cavity element and be sealed thereagainst by an O ring fitting in the recess 19. The closure element 30 is provided with a central throughbore which is tapered at 33. The throughbore is adapted for feeding pre-expanded polystyrene pellets to the mold cavity interior and it has been found that the tapered shape at 33 facilitates the filling operation. The mold closing element is again undercut at 34 so that in the closed position, the counterbore 24 of the mold cavity element will be relatively unobstructed and permit good communication between the bore holes 26 due to the shape of the undercut 34. The closest element 30 is then provided with a slight enlargement at 35 approximately in line with the undercut 32 for sealing engagement with the interior of the mold cavity element. To this end, a ring shaped recess is provided at 36 to receive a suitable O ring for sealing engagement with the top surface of the counterbore 24 of the mold cavity element, while the further undercut at 37 will fit substantially snugly within the counterbore 27 to provide a smooth closing of the interior molding chamber.

Referring now to FIGURE 4, it will be seen that the mold core element indicated generally at 40, has a substantially cup-shaped interior with gradually outwardly tapering side walls 41 and a flat top wall 42 that is interrupted by a fluid opening at 43. The side walls 41 stop abruptly at the shaped area 44 of the flange 45. It will be understood that the shaped area 44 defines the molding limit, which will be the lip of a cup formed within the mold cavity. Adjacent the shaped area 44 is a tapered portion 44′ which will fit snugly against the interior mold cavity surface 29, thus providing an effective seal of the mold cavity. The mold core element may be attached to a suitable support 60, described hereinafter by means of the bolt receiving openings 46. A good sealing relationship with the supporting member will be provided by the use of a number of O rings at 47. The interior of the flange 45 is interrupted by a counterbore at 48 leading to a small air jet opening at 49. The opening 49 is desired to release air to the interior of a cup just after formation, to lift the cup and separate it from the mold core so that the cup can be quickly removed from the molding area.

A conduit 50 is provided within the hollow interior of the mold core to supply stream, air and water to such area to cool and heat the interior walls 51. Preferably, the conduit 50 may be provided by a pipe 52 which may have a shaped upper end 53 adapted to cooperate with the opening 43 to seal it when desired. In FIGURE 4 there is also shown the suport member 60 for the mold core element, which is of generally circular shape, as indicated at 61. A counterbore is provided at 62 to receive the mold core element which may be secured thereto by means of the bolt receiving openings 66. An enlarged counterbore 63 is provided in the center of the element 61 as a drain opening and to permit entry of the conduit 50. The element 61 may be attached to a suitable support by means of the bolt receiving openings at 68.

It will be understood that the just described molding elements will be connected to suitable supply conduits for air, water and steam, and to suitable drain elements, all of which are known in the art and are not relied on here for inventive novelty. The molding elements just described are of course to be assembled into operative interrelationship, defining a molding unit, for molding cup-shaped elements, and it will be understood that a plurality of such molding units can be combined in pairs or in virtually any number, usually in groups of twelve or twenty-four, to provide a multiple unit molding machine. This is an efficient system since the air, water, and steam supply lines can come from common sources, a single drain can supply the entire machine, and a conveyor belt and blowers can be used to unload and transport the product of the several molding units to a packaging station. Hence, output can be optimized depending on packaging capacity.

The operation of the molding unit according to the present invention, is not the subject of this disclosure, but will be explained here to facilitate understanding. Briefly, an electric drive is provided, either for each molding unit, but preferably a single electric drive is provided for each molding machine to synchronize operations, cut down the number of parts, make use of bigger and more reliable electric motors, and the like. The electric drive is used through a clutch mechanism, friction engagement, or the like, to drive a shaft upon which cams are mounted. The cams in turn will actuate cam followers and electrical switches in operative relatioinship with the cam followers, and the electrical switches will in turn control the elements necessary to successful employment of the present molding unit. For example, one cam will actuate hydraulic or pneumatic cylinders to close the mold cavity element 10 onto the mold core element 20, and the same cam or another cam can be used to close the element 30 onto the mold cavity element 10. A separate cam will then control the mold filling cycle, so that pre-exanded polystyrene particles from a common hopper can be fed into the mold cavity defined by the space between the core element 40 and the cavity element 10. Usually, this cavity will be filled to the top, although the feed control can be varied so as not to fill the mold completely. A cam can also be provided to control air pressure to blow a measured amount of pre-expanded material into the cup forming cavity.

Thereafter, a separate cam can be used to control the steam cycle to heat both the elements 10 and 40 to complete expansion of the polystyrene pellets, and to cause fusion between the particles to a point where a cup will be formed with smooth inner and outer surfaces that will be leak proof. The steam may then be blown out with air controlled by another cam, and then water is used, following either the steam or air cycle, to cool the molding surfaces and cause slight contraction of the cup to permit removal. A further cam will control air flow to blow the water from inside the mold cavity and mold core, while another cam, or the cams mentioned first, will cause the mold cavity element to be lifted and open the mold. Another cam will then cause air to be blown through the opening 49 to lift the just molded cup slightly off the core 40, after which a further cam will control a blast of air from a source outside the molding unit, to blow the cup from the molding area and into a suitable conveyor, as indicated above. The cycle may then be repeated by rotating the first mentioned mold closing cam around to begin the operation over again.

It will be understood that the several operations just described can be accomplished with a lesser number of cams. However, a separate cam for each operation is preferred since the interrelationship between the several cams can be varied by an operator, by simply changing the position of the cams and without machining, or substituting a new cam. With the control mechanism just described, it has been found that the molding unit according to the present invention can go through a complete cycle in four seconds, and even less, during completely continuous operation. This has permitted round the clock production at a faster rate per unit and with fewer personnel than has been known heretofore.

Moreover, the resultant cups will be stronger than those presently known, and will have better insulating properties; yet, such improved cups will be formed from about half as much material as is presently known, for the same liquid capacities. While the cups produced according to the present invention will have thicker walls than presently known, due to this improved apparatus and resultant improved control on the amount of expansion and fusion, requiring more packaging and stacking space, the savings in material and production and the improvement in product more than compensate for the one half inch to one and one half inch greater packaging space that is required per stack of cups.

The foregoing description is to be interpreted as illustrative, and should not be construed as limiting on this invention since certain changes will be apparent to those skilled in the art that may differ from the form shown, but will come within the scope of the appended claims.

Having thus described the invention, what is claimed and desired to be secured by Letters Patent is:

1. A one-piece mold cavity for use in producing an expanded polystyrene cup by injection molding into a space between the cavity element and a cup-shaped mold core element; said one-piece mold cavity element having an inner molding element, a central fluid chamber element, and an outer work actuating element; said inner, central and outer elements being formed from a single casting with the casting having a generally tapered, frusto conical exterior and interior shapes, a tapered counterbore at the top end thereof, leading to a throughbore that opens into said inner element, the frusto conical exterior of said outer element having at the top a circular flange enlargement and therebelow, another flange enlargement of greater diameter and less thickness, and at the bottom of the exterior, a further flange enlargement of greater thickness and greater diameter than the two upper flange enlargements, the lowermost flange enlargement having vertical openings therein for cooperation with a securing means to secure the mold cavity element to a drain opening closing flange, and at least one opening in said lowermost flange enlargement for the entry of fluids such as air, water and steam, and a drain opening for said fluids, the counterbored end of said outer element being shaped for engagement with a mold filling and closing member; said inner molding surface being generally smooth with an upwardly and inwardly sloping taper, terminating at a circular horizontally disposed flange and defining therewith a frusto-conical shape, said circular flange being open in the center thereof for cooperation with a mold filling and closing element adapted to shape the outside bottom of the cup, said inner molding surface terminating at a first frusto-conical shaped counterbore that is only slightly larger in diameter than said inner molding surface, and relatively short in length to define a mouth engaging lip on the cup, and a bottom flage adjacent said inner molding surface and slightly larger in diameter therefrom, for snug engagement with the mold core element; said central fluid chamber area comprising a great plurality of long circular bore holes in the otherwise solid material, there being at least a sufficient number of bore holes to provide large enough surface area to permit rapid heating and cooling of said inner molding surface by conduction from fluids in the bore holes, said bore holes being open at the upper end to said tapered counterbore and said bore holes being open at the lower end to the drain opening and fluid entry port of the lower-most flange.

2. In combination, a one-piece mold cavity, a mold core, a mold filling and closing member, said mold core comprising an inverted generally cup-shaped member with an outer surface as a generally smooth molding surface and a hollow interior for receiving heating and cooling fluids to act on the molding surface by conduction through the mold core body, said mold core having a flat top and gradually outwardly and downwardly tapering sides, and an open bottom leading to the hollow interior, said mold core having an enlarged bottom flange on the exterior thereof with vertical epenings in said bottom flange for securing said mold core to a supporting surface, said flange on the upper edges thereof having a shaped recess for sealing cooperation with said one-piece mold cavity, a conduit disposed in the hollow interior of said mold core for introducing air, steam and water according to a predetermined cycle to the inside of the core to heat and cool the molding surface thereof; said one-piece mold cavity element having an inner molding element, a central fluid chamber element, and a outer work actuating element; said inner, central and outer elements being formed from a single casting with the casting having a generally tapered, frusto conical exterior and interior shapes, a tapered counterbore at the top end thereof, leading to a through-bore that opens into said inner element, the frusto-conical exterior of said outer element having at the top, a circular flange enlargement and therebelow, another flange enlargement of greater diameter and less thickness, and at the bottom of the exterior, a further flange enlargement of greater thickness and greater diameter than the two upper flange enlargements, the lowermost flange enlargement having vertical openings therein for cooperation with a securing means to secure the mold cavity element to a drain opening closing flange, and at least one opening in said lowermost flange enlargement for the entry of fluids such as air, water and steam, and a drain opening for said fluids, the counterbored end of said outer element being shaped for engagement with a mold filling and closing member; said inner molding surface being generally smooth with an upwardly and inwardly sloping taper, terminating at a circular horizontally disposed flange and defining therewith a frusto-conical shape, said circular flange being open in the center thereof for cooperation with a mold filling and closing element adapted to shape the outside bottom of the cup, said inner molding surface terminating at a first frusto-conical shaped counterbore that is only slightly larger in diameter than said inner molding surface, and relatively short in length to define a mouth engaging lip on the cup, and a bottom flange adjacent said inner molding surface and slightly larger in diameter therefrom, for snug engagement with the mold core element; said central fluid chamber area comprising a great plurality of long circular bore holes in the otherwise solid material, there being at least a sufficient number of bore holes to provide large enough surface area to permit rapid heating and cooling of said inner molding surface by conducting from fluids in the bore holes, said bore holes being open at the upper end to said tapered counterbore and said bore holes being open at the lower end to the drain opening and fluid entry port of the lowermost flange.

3. The combination of claim 2 wherein the mold filling and closing member is disc shaped, having a central throughbore with an inverted cone shaped area at the inlet end thereof for transferring material to the interior of the mold cavity element; an enlarged sealing surface in the plane of said inlet end for sealing the large mold cavity element counterbore; an undercut area therebeneath for permitting free fluid passage in the last mentioned counterbore; and a lower sealing surface that is enlarged with respect to the undercut area, for sealing the narrower mold cavity element counterbore and for closing the top of the interior molding chamber.

4. A machine comprising a plurality of the molding elements defined in claim 2, said elements being arranged in cooperative relationship with one another, with sources of air, water and steam, with drainage conduit and with means for removing formed drinking cups from each molding area and for transporting the formed drinking cups to a packaging area.

5. In combination with the elements defined in claim 2, an electric drive and a plurality of cams on a shaft driven by said electric drive, with a cam follower and an electrical switch responsive to each cam, said electrical switches being adapted to control the movement of air, water and steam to said mold cavity and mold core, to control the supply of expanded polystyrene to said mold closing and filling elements, and to control the interrelating movement of said mold closing and filling element, said mold cavity element and said mold core element.

References Cited

UNITED STATES PATENTS

| | | | |
|---|---|---|---|
| 3,118,176 | 1/1964 | Freedman et al. | 18—5 |
| 3,125,780 | 3/1964 | Harrison et al. | 18—5 |
| 3,162,705 | 12/1964 | Smucker et al. | 18—5 X |
| 3,224,037 | 12/1965 | Robbins et al. | 18—5 |
| 3,224,040 | 12/1965 | Bridges et al. | 18—5 |
| 3,261,055 | 7/1966 | Dart | 18—5 |

J. HOWARD FLINT, JR., *Primary Examiner.*